United States Patent
Krishnamurthy et al.

(10) Patent No.: US 8,250,578 B2
(45) Date of Patent: Aug. 21, 2012

(54) PIPELINING HARDWARE ACCELERATORS TO COMPUTER SYSTEMS

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 12/035,511

(22) Filed: Feb. 22, 2008

(65) Prior Publication Data

US 2009/0217275 A1  Aug. 27, 2009

(51) Int. Cl.
*G06F 13/00* (2006.01)
*G06F 9/26* (2006.01)
*G06F 15/76* (2006.01)
*G06F 9/44* (2006.01)
*G06F 9/45* (2006.01)
*G06F 3/00* (2006.01)
*G06F 13/36* (2006.01)

(52) U.S. Cl. .......... 718/102; 711/147; 711/207; 712/34; 717/120; 717/160; 710/3; 710/310

(58) Field of Classification Search .................. 711/147, 711/207; 712/34; 717/120, 160; 710/3, 710/310
See application file for complete search history.

(56) References Cited

U.S. PATENT DOCUMENTS

| | | | |
|---|---|---|---|
| 5,859,988 A | 1/1999 | Ajanovic et al. | |
| 5,872,993 A | 2/1999 | Brown | |
| 6,061,754 A | 5/2000 | Cepulis et al. | |
| 6,145,043 A * | 11/2000 | Sych et al. | 710/310 |
| 6,216,173 B1 | 4/2001 | Jones et al. | |
| 6,298,370 B1 | 10/2001 | Tang et al. | |
| 6,317,803 B1 | 11/2001 | Rasmussen et al. | |
| 6,622,177 B1 * | 9/2003 | Eilert et al. | 710/3 |
| 6,772,218 B1 | 8/2004 | Noel, Jr. et al. | |
| 6,912,493 B1 * | 6/2005 | Scheel et al. | 703/2 |
| 6,961,794 B2 | 11/2005 | Atherton et al. | |
| 6,999,894 B2 | 2/2006 | Lin et al. | |
| 7,093,147 B2 | 8/2006 | Farkas et al. | |
| 7,103,695 B2 | 9/2006 | Peil et al. | |
| 7,426,597 B1 | 9/2008 | Tsu et al. | |
| 7,600,155 B1 | 10/2009 | Nickolls et al. | |
| 7,619,629 B1 | 11/2009 | Danilak | |

(Continued)

FOREIGN PATENT DOCUMENTS

WO 2006112844 A1 10/2006

OTHER PUBLICATIONS

Theo Ungerer et al., "A Survey of Processors with Explicit Multithreading", ACm Computing Surveys, vol. 35, No. 1, Mar. 2003, pp. 29-63.

(Continued)

*Primary Examiner* — Thomas Lee
*Assistant Examiner* — Aurel Prifti
(74) *Attorney, Agent, or Firm* — Cantor Colburn LLP; Steven Chiu

(57) ABSTRACT

A method of pipelining hardware accelerators of a computing system includes associating hardware addresses to at least one processing unit (PU) or at least one logical partition (LPAR) of the computing system, receiving a work request for an associated hardware accelerator address, and queuing the work request for a hardware accelerator using the associated hardware accelerator address.

18 Claims, 5 Drawing Sheets

U.S. PATENT DOCUMENTS

| | | |
|---|---|---|
| 7,664,882 B2 | 2/2010 | Mohammed et al. |
| 8,042,184 B1 | 10/2011 | Batenin |
| 2003/0028751 A1* | 2/2003 | McDonald et al. ............ 712/34 |
| 2003/0041163 A1 | 2/2003 | Rhoades et al. |
| 2003/0126346 A1 | 7/2003 | Kuo |
| 2005/0097305 A1 | 5/2005 | Doering et al. |
| 2005/0200627 A1 | 9/2005 | Desylva |
| 2005/0273772 A1 | 12/2005 | Matsakis et al. |
| 2005/0278502 A1 | 12/2005 | Hundley |
| 2006/0064546 A1* | 3/2006 | Arita et al. .................. 711/130 |
| 2006/0167966 A1* | 7/2006 | Kumar et al. ................ 709/201 |
| 2006/0200802 A1* | 9/2006 | Mott et al. ................... 717/120 |
| 2006/0294321 A1* | 12/2006 | Mehta .......................... 711/147 |
| 2007/0074004 A1 | 3/2007 | Wong et al. |
| 2007/0157211 A1* | 7/2007 | Wang et al. .................. 719/313 |
| 2007/0168646 A1* | 7/2007 | Collard et al. ................. 712/34 |
| 2007/0169059 A1* | 7/2007 | Halambi et al. .............. 717/160 |
| 2008/0028408 A1* | 1/2008 | Day et al. ..................... 718/104 |
| 2008/0120626 A1 | 5/2008 | Graffagnino et al. |
| 2008/0165196 A1 | 7/2008 | Bakalash et al. |
| 2009/0049451 A1* | 2/2009 | Bates ........................... 718/108 |
| 2011/0072234 A1* | 3/2011 | Chinya et al. ................ 711/207 |

OTHER PUBLICATIONS

Rudrajit Samanta et al., "Hybrid Sort-First and Sort-Last Parallel Rendering with a Cluster of PCs", pp. 97-108.

Manjunath Kuslar et al., "Streamroller: Automatic Synthesis of Prescribed Throughput Accelerator Pipelines", Codes+ISSS'06, Oct. 22-25, 2006, Seoul, Korea, pp. 270-275.

z/Architecture Principles of Operation, International Business Machines Corporation, SA22-7832-05, Sixth Edition (Apr. 2007).

Non Final Office Action dated Jan. 5, 2012 U.S. Appl. No. 12/035,517.

\* cited by examiner

PIPELINING HARDWARE ACCELERATORS TO COMPUTER SYSTEMS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

Generally, example embodiments of the present disclosure relate to hardware accelerators, and more particularly to providing a method, system, and computer program product for streaming attachment of hardware accelerators to computing systems.

General purpose processors like Intel®, AMD® and IBM POWER® are designed to support a wide range of workloads. If processing power beyond existing capabilities are required then hardware accelerators may be attached to a computer system to meet requirements of a particular application. Examples of hardware accelerators include FPGAs (Field Programmable Gate Arrays), the IBM Cell B.E. (broadband engine) processor, and graphics processing units (GPUs). Hardware accelerators are typically programmable to allow specialization of a hardware accelerator to a particular task or function and consist of a combination of software, hardware, and firmware. Such hardware accelerators may be attached directly to the processor complex or nest, by PCI-express (peripheral component interconnect) IO (input-output) slots or using high-speed networks, for example, Ethernet and Infiniband®.

Systems where processors have a static mapping of 1:1 (e.g., processor:accelerator), with a processor cluster and accelerator cluster packaged separately, may be severely limited by scalability. However, systems attempt to provide performance similar to processors mapped to several accelerators for larger tasks. It follows however, that as workloads for each processor increase, the resources available in the single mapped accelerator are quickly diminished, thereby reducing system throughput overall.

More clearly, if a processor in a system with 1:1 processor: accelerator ratio requires acceleration, the processor may have to wait until results are returned from the accelerator before additional data is passed to the accelerator. Such static 1:1 mappings limit throughput and performance. Therefore, it may be desirable to provide a solution that overcomes these drawbacks.

BRIEF SUMMARY OF THE INVENTION

An example embodiment includes a method of pipelining hardware accelerators of a computing system. The method includes associating hardware addresses to at least one processing unit (PU) or at least one logical partition (LPAR) of the computing system, receiving a work request for an associated hardware accelerator address, and queuing the work request for a hardware accelerator using the associated hardware accelerator address.

Another example embodiment includes a computing system. The computing system includes an accelerator farm, and a plurality of hardware accelerators disposed in the accelerator farm. Each hardware accelerator of the plurality of hardware accelerators includes a plurality of partitions configured in a vertical pipeline, and the plurality of hardware accelerators is configured in a horizontal pipeline.

A further example embodiment includes computer program product including a computer readable medium with program segments for, when executed on a computer device, causing the computer device to implement a method of pipelining accelerators of a computing system. The method includes associating hardware addresses to at least one processing unit (PU) or at least one logical partition (LPAR) of the computing system, receiving a work request for an associated hardware accelerator address, and queuing the work request on the PU or in a hardware accelerator using the associated hardware accelerator address.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 1:
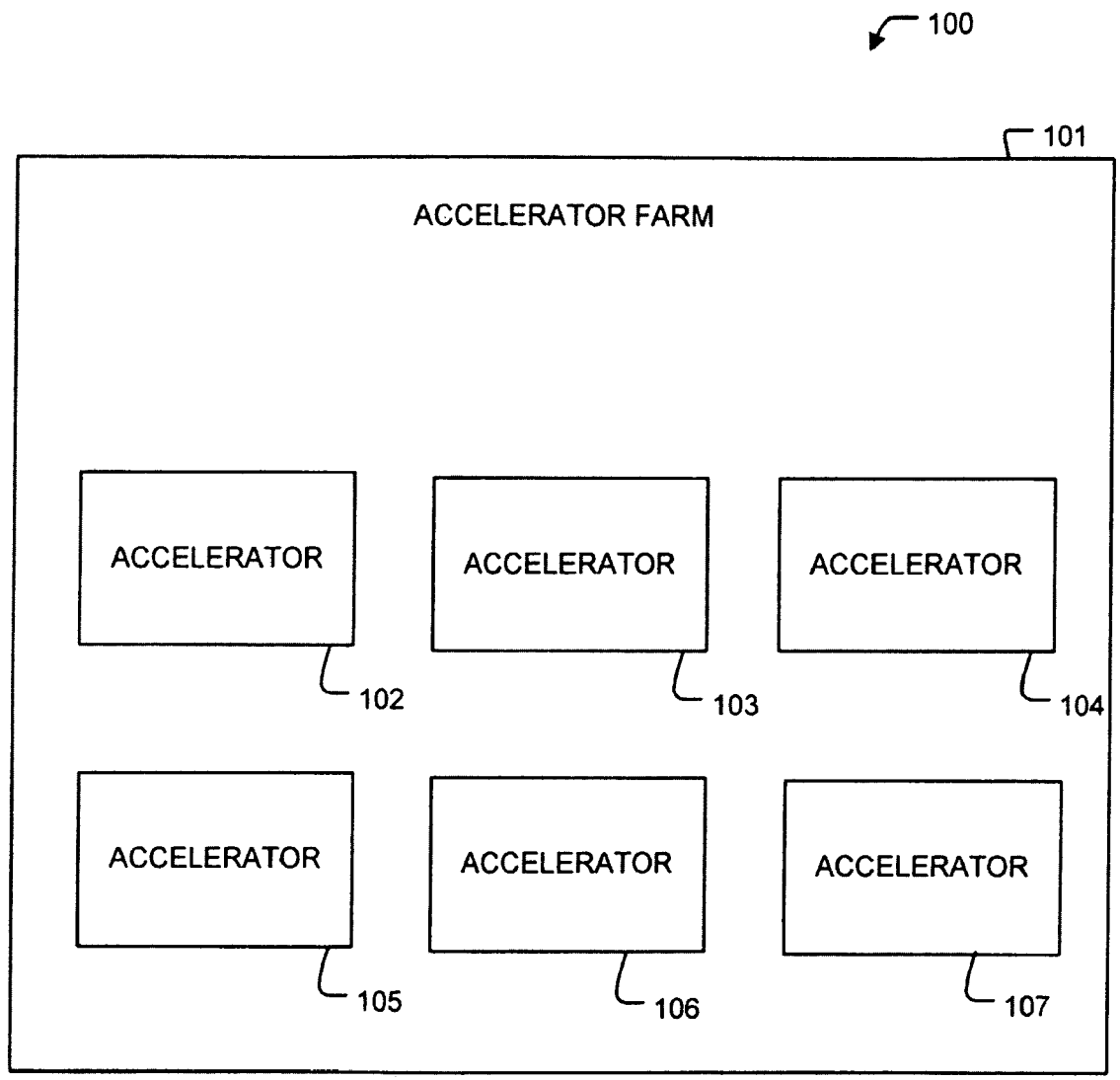
FIG. 1 illustrates an accelerator farm of a computing system, according to an example embodiment.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It should be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail. An example embodiment of the present invention provides methodologies which may use static and/or dynamic mapping of hardware accelerators to achieve increased throughput in computing systems. This increase in throughput results in decreased computational time and faster processing of the computing systems in general. Accordingly, example embodiments may overcome the drawbacks of 1:1 processor to accelerator mapping described above.

For example, example embodiments provide pipelining architectures with 1:many mapping schemes for processors, and dynamic mapping schemes for processors. The 1:many scheme involves static binding where a 1:many mapping between processors and accelerators is provided at application activation time. The mapping may not change during application execution. The dynamic mapping scheme includes a static mapping of processors to a fixed set of accelerators (e.g., 0 or more accelerators in the fixed set), and further provides a shared pool of accelerators for increased accelerator throughput. As used hereinafter, the term "static-pipelining" may refer to a mapping of 1:many accelerators at application activation time, and the term "dynamic-pipelining" may refer to mapping of a fixed set of accelerators and a shared pool of accelerators. It follows that static-pipelining and dynamic-pipelining are similar in that a fixed set of accelerators are mapped to a given processor, however, for dynamic pipelining, a shared pool of accelerators is further included for additional throughput when necessary. Hereinafter, architectures for pipelining accelerators of a computing system are described more fully with reference to the drawings.

Turning to FIG. 1, an accelerator farm 101 of a computing system 100 is illustrated, according to an example embodiment. The accelerator farm 101 includes a plurality of accelerators 102-107. Each accelerator of the plurality of accelerators may be configured to perform different forms of acceleration, similar forms of acceleration, or any combination thereof. It is noted that more or less accelerators may be included depending upon any particular implementation, therefore, example embodiments should not be limited to the particular number of accelerators illustrated.

According to example embodiments, each accelerator may be partitioned such that each partition of a given accelerator may work independently from other partitions. In this manner, processing from each partition may not interfere with tasks of other partitions. Furthermore, each accelerator may be multiplexed such that tasks are distributed among several accelerators. For the purposes of this disclosure, assignment of tasks across multiple partitions of a given accelerator is termed "vertical pipelining" and assignment of tasks across multiple accelerators is termed "horizontal pipelining". A more detailed discussion of both vertical and horizontal pipelining is provided below with reference to FIG. 2.

Figure 2:
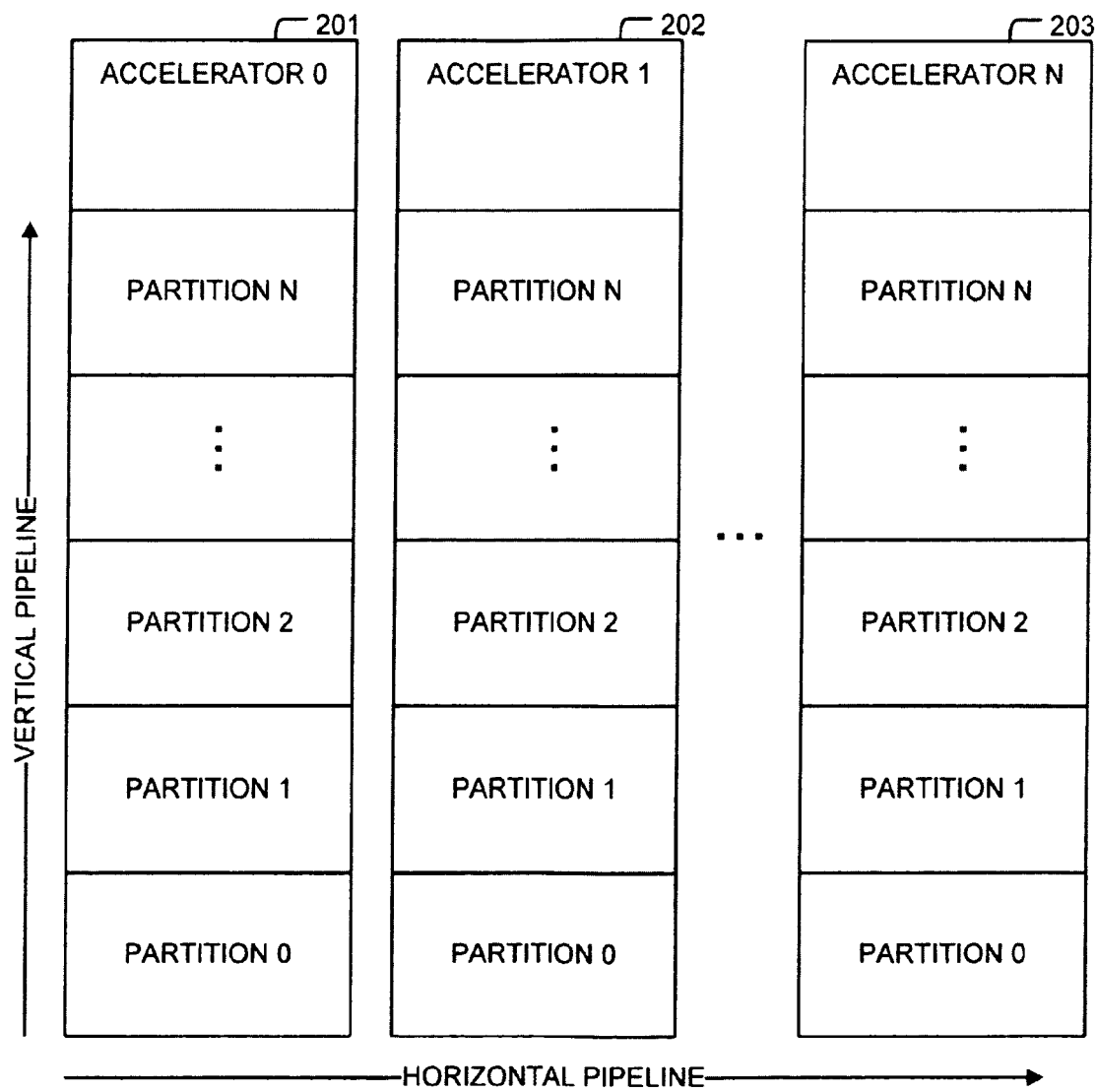
FIG. 2 illustrates a pipelined architecture for hardware accelerators, according to an example embodiment.

FIG. 2 illustrates a pipelined architecture for hardware accelerators, according to an example embodiment. As illustrated, a plurality of accelerators 200 may be included within a computing system. Each accelerator (201-203) may be included within an accelerator farm of the computing system. Each of the plurality of accelerators may be divided into N partitions. Each partition of a given accelerator may operate independently from one another, thereby reducing the impact of performance across each partition.

According to example embodiments, an application of a processing unit of the computing system may strategize to assign tasks across several accelerators. This horizontal pipelining approach may maximize accelerator throughput through division of tasks across independent accelerators. It follows, however, that one or more of the accelerators may exist in shared pool of accelerators, thereby limiting the number of accelerators available for horizontal pipelining. In this example, the application may attempt to assign tasks to separate partitions of independent accelerators. For example, a virtual input queue may be provided for an available partition of a particular accelerator. Each busy partition may be processed independently of other partitions, and results may be provided after processing is terminated for a given queue.

Alternatively, a fixed set of accelerators may be mapped to only a particular processing unit of the computing system. In this example, horizontal pipelining may be attempted until each accelerator is assigned a task. Upon each accelerator being assigned a task (i.e., horizontal pipeline full), vertical pipelining may be used to assign tasks to separate partitions of the plurality of accelerators.

In still another alternative, a fixed set of accelerators may be mapped to a given processor. In this example, horizontal pipelining may be attempted until each accelerator of the fixed set is assigned a task. Upon each accelerator being assigned a task (i.e., horizontal pipeline full), additional accelerators may be mapped from a shared pool of accelerators such that additional horizontal pipelining may be attempted.

In yet another alternative, a fixed set of accelerators may be mapped to a given processor. In this example, vertical pipelining may be attempted until a particular accelerator of the fixed set has a task assigned for each partition therein. Upon each partition being assigned a task (i.e., vertical pipeline is full), an additional accelerator may be assigned tasks (i.e., horizontal pipelining).

However, it should be understood that additional combinations of horizontal and vertical pipelining are applicable to example embodiments. For example, partial vertical pipelines may be used in conjunction with horizontal pipelines (i.e., each partition may not be utilized before horizontal pipelining is attempted) and alternatively, partial horizontal pipelines may be used in conjunction with vertical pipelines (i.e., each accelerator may not be assigned a task before vertical pipelining is attempted). Moreover, additional combinations of each of horizontal pipelining and vertical pipelining may be used to increase accelerator throughput overall. The choice of "vertical" or "horizontal" pipelining is termed a dispatch strategy. If "vertical" accelerator partitions do not influence each other then a "vertical-first, horizontal-next" dispatch strategy may be used. If a large pool of independent accelerators is available for use then a "horizontal-first, vertical-next" dispatch strategy attempts to maximize throughput when executing multiple vertical partitions on a single accelerator are likely to influence each other.

It is noted that virtual input queues may be used to assign tasks to partitions of a given accelerator. Virtual input queues should not be limited to vertical pipelining only, as queues may be added to individual partitions in horizontal pipelining as well. Hereinafter, virtual input queues are described more fully with reference to FIG. 3.

Figure 3:
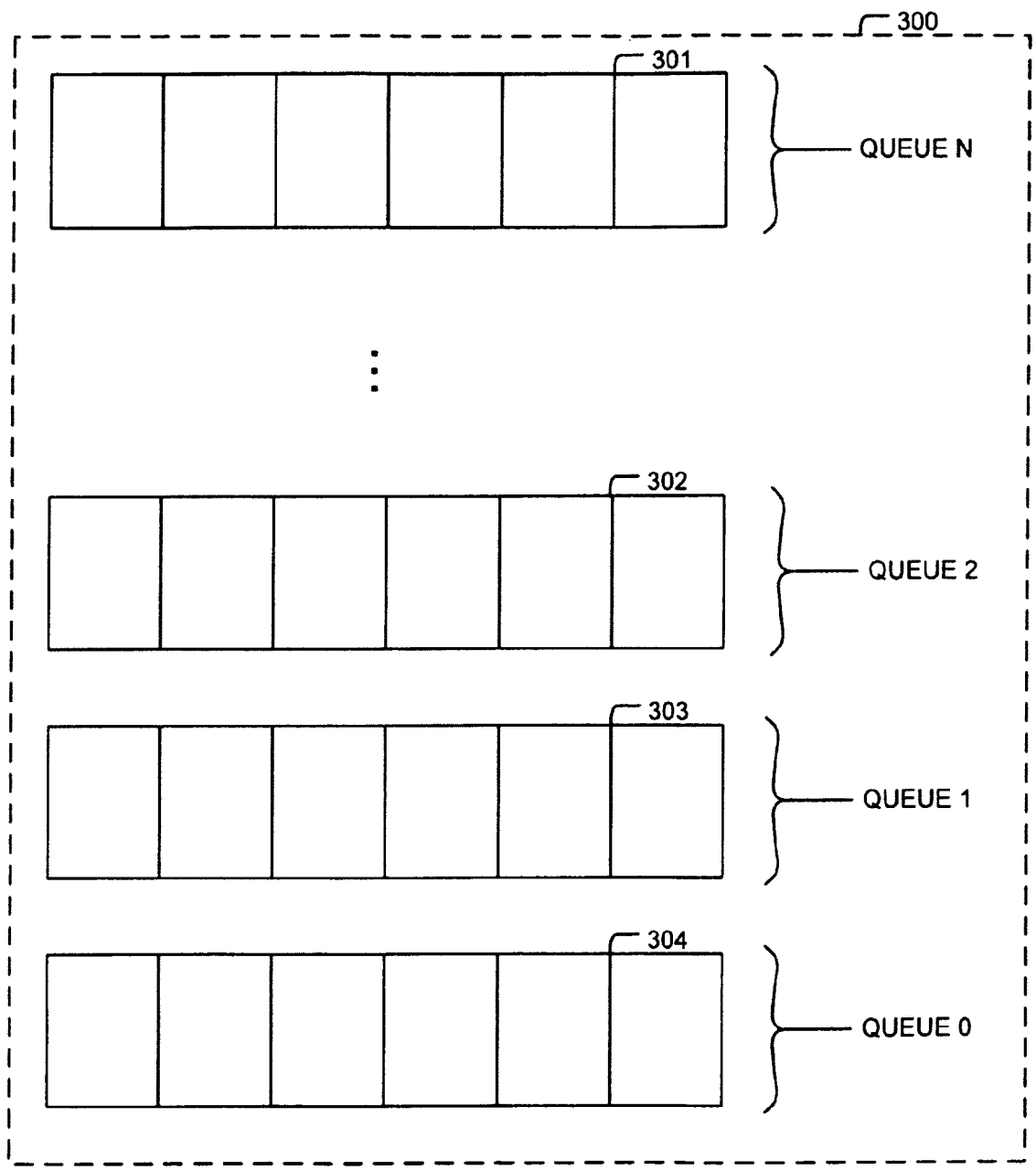
FIG. 3 illustrates a virtual input queue architecture for pipelined hardware accelerators, according to an example embodiment.

FIG. 3 illustrates a virtual input queue architecture for pipelined hardware accelerators, according to an example embodiment. As illustrated, a plurality of virtual input queues 300 may be included for a given accelerator. If virtual input queues are allocated only on the PU then this is termed host-side virtual input queues. If virtual input queues are allocated on the accelerator then this is termed accelerator-side virtual input queues. If virtual input queues are allocated on both host-side and accelerator-side queues, then this is termed two-sided virtual input queues. Instead of supporting a single queue for each accelerator, a virtual input queue supports queuing of tasks on a vertical partition-basis. With such an organization, tasks that finish late because of increased computational requirements will not block tasks that were submitted later but finish earlier across separate partitions. Virtual input queues increase throughput of processors seeking acceleration support. For example, Queue 0 (see 304) in FIG. 3 can support partition 0 on FIG. 2, Queue 0 (see 303) can support partition 1 on FIG. 2 and so on. A virtual input queue system 300 may be instantiated for each accelerator unit (201-203) in FIG. 2, where each sub-queue of 300 (301-304) is mapped to one partition of (201-203) in FIG. 2. Each queue (301-304) may queue descriptors that include fields for identifying individual tasks (see divisions of virtual input queues illustrated). For example, each field of a given queue may be populated with information relating to a task, including data necessary for the task or information related to locating the data related to the task. As each task of a particular queue is completed, a next task included within the queue may be processed. In this manner, tasks assigned to any partition of an accelerator may be organized. Hereinafter, a method of pipelining hardware accelerators is described more fully with reference to FIG. 4. It is noted that the methodology described may be used in a system including one or more accelerators such that horizontal and vertical pipelining may be used to increase accelerator throughput.

Figure 4:
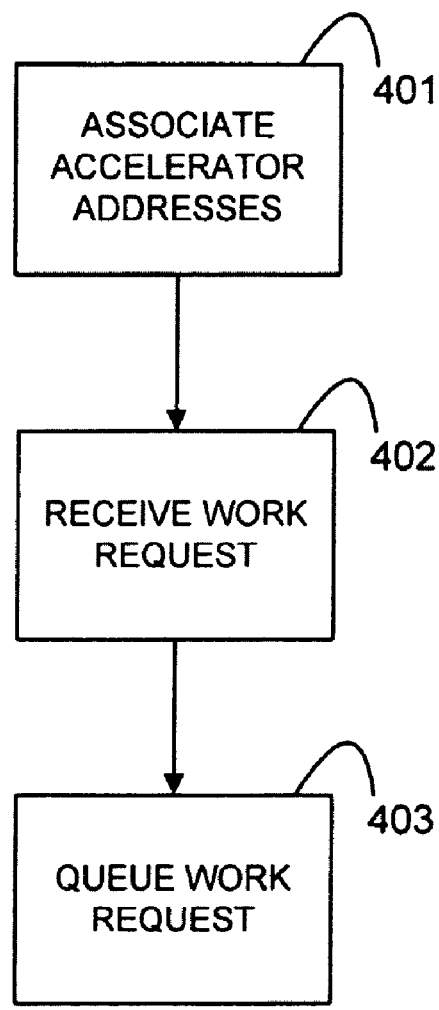
FIG. 4 illustrates a method of pipelining hardware accelerators, according to an example embodiment.

Turning to FIG. 4, a method of pipelining hardware accelerators, according to an example embodiment, is illustrated. The method 400 includes associating accelerator addresses at block 401. For example, for static-pipelining, a set of Internet Protocol (IP) addresses is associated with a processing unit (PU) and/or logical partition (LPAR) of a computing system. The associated addresses are therefore mapped to a particular PU and/or LPAR. Upon association, work requests or tasks may be assigned to IP addresses corresponding to the mapped accelerators. A PU simply has to round-robin through available addresses to complete horizontal pipelining for example. Vertical pipelining can be supported by associating identifiers for each partition with the IP address of the accelerator. In this manner, a 1:many mapping may be configured.

Alternatively, a set of memory-mapped input/output (MMIO) addresses or port input/output (PIO) addresses may be associated with a PU and/or LPAR. The MMIO and/or PIO addresses may be included within a map or resource server of the computing system which may store address ranges for available accelerators. Upon association, work requests or tasks may be assigned through direct addressing of relevant MMIO addresses. In this manner, a 1:many mapping may be configured. Furthermore, additional MMIO/PIO addresses may be associated with a shared pool list or listing. The list or listing may also be stored alongside the map or resource server. Therefore, additional accelerators may be assigned tasks through request of an accelerator from the shared pool. It will be understood that once MMIO addresses are known, the PU may provide a list of memory regions to the accelerator for DMA (Direct Memory Access) of data using suitable handshaking implemented using doorbell registers and other constructs.

Therefore, as described above, static mapping of one or more accelerators may be facilitated through accelerator address association. The mapping may further include a shared resource pool mapping to facilitate increased accelerator throughput.

Turning back to FIG. 4, the method 400 includes receiving a work request at block 402. For example, a PU or LPAR may issue a work request. The work request may be received and an associated accelerator may be identified for the PU and/or LPAR. It is noted that the associated accelerator may be identified from either the 1:many static mapping or the shared pool of accelerators.

In an example of static mapping of a fixed set of accelerators to a PU/LPAR, each PU/LPAR may include a mapped set of accelerators initialized during activation of an application residing on the PU/LPAR. The application may be configured to allocate accelerators for the static mapping. More clearly, during application activation, the application may associate a fixed set of accelerators from a group of available accelerators to the PU/LPAR the application resides on. It is noted that static mapping of a fixed set of accelerators may be used in conjunction with both static and dynamic pipelining.

For example, in dynamic pipelining, a fixed set (e.g., zero or more) of accelerators may be mapped to a PU/LPAR. The fixed set may be mapped during application activation. However, if the fixed set comprises zero accelerators, it follows that no accelerators will be mapped to the fixed set for the PU/LPAR However, a shared pool of accelerators may be mapped to the PU/LPAR. The shared pool may be mapped in one of two manners. In the first manner, the entire shared pool of accelerators may be mapped to the PU/LPAR during application activation. It follows that communication between PU/LPAR and a central resource server may be employed to limit collision of work requests for the first manner. For example, a token may be passed between a central resource server and PU/LPAR issuing work requests for the shared pool. If an accelerator from the shared pool is available, a token may be issued to the PU requesting accelerator access. Upon completion of the work request, the token may be released such that additional processing units may issue work requests to the same accelerator. In the second manner, the map server described above may be accessed to identify available accelerators from the shared pool. It follow that as each accelerator from the pool is issued work requests, the map server updates the stored listing of available accelerators to reflect work requests being handled by particular accelerators. In the manners described above for both static and dynamic pipelining, associated accelerators may be identified.

Upon identification of the associated accelerator, the method 400 includes queuing the work request on one of (i) the PU and (ii) accelerator partition and (iii) combination of PU-side and accelerator-side resources. For example, if horizontal pipelining is employed by an application residing on a PU, work requests may be queued across multiple accelerators. Furthermore, if vertical pipelining is employed by the application, work requests may be queued across multiple partitions of any associated accelerator. As described above, different combinations of vertical and horizontal pipelining may be employed to increase system throughput. Furthermore, horizontal and vertical pipelining may be extended across accelerators of a shared pool. Therefore, example embodiments provide methodologies for pipelining accelerators of a computing system such that increased system throughput may be achieved.

Accelerator mapping may be assigned during application activation. Furthermore, accelerator mapping may be assigned by a resource server employing a listing of available accelerators. The listing may include a fixed or dynamic list of accelerators available from a shared pool of resources.

Figure 5:
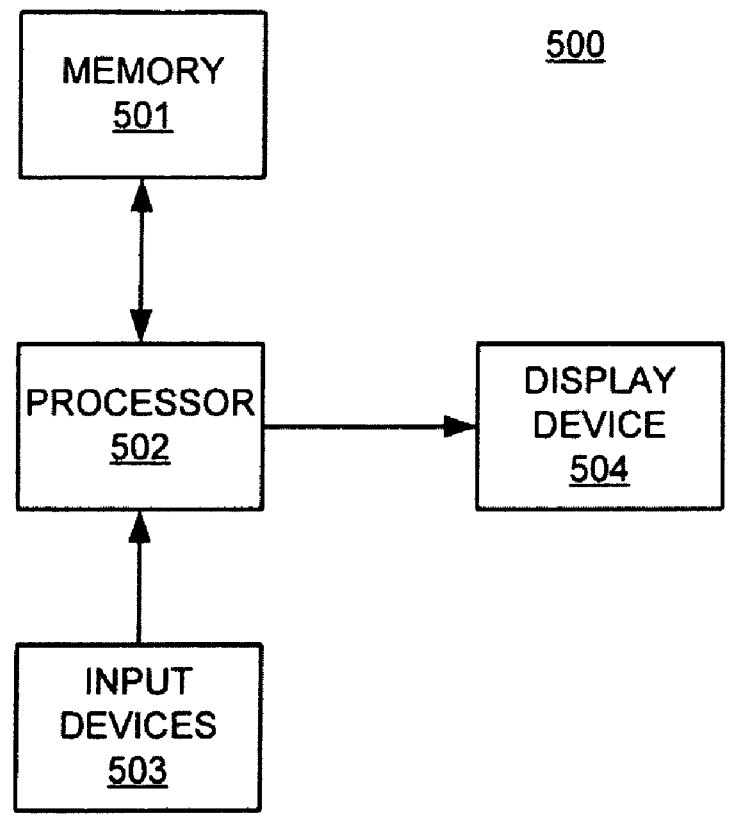
FIG. 5 illustrates a computer apparatus, according to an example embodiment.

It is further noted that embodiments of the invention may be embodied in the form of computer-implemented processes and apparatuses for practicing those processes. Therefore, according to an exemplary embodiment, the methodologies described hereinbefore may be implemented by a computer system or apparatus. For example, FIG. 5 illustrates a computer apparatus, according to an exemplary embodiment. Therefore, portions or the entirety of the methodologies described herein may be executed as instructions in a processor 502 of the computer system 500. The computer system 500 includes memory 501 for storage of instructions and information, input device(s) 503 for computer communication, and display device 504. Thus, the present invention may be implemented, in software, for example, as any suitable computer program on a computer system somewhat similar to computer system 500. For example, a program in accordance with the present invention may be a computer program product causing a computer to execute the example methods described herein.

The computer program product may include a computer-readable medium having computer program logic or code portions embodied thereon for enabling a processor (e.g., 502) of a computer apparatus (e.g., 500) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

The invention claimed is:

1. A method of pipelining a plurality of hardware accelerators of a computing system, comprising:
    pipelining individual partitions of each hardware accelerator of the plurality of hardware accelerators in a vertical pipeline associated with each hardware accelerator of the plurality of hardware accelerators;
    pipelining each hardware accelerator of the plurality of hardware accelerators in a horizontal pipeline associated with all hardware accelerators of the plurality of hardware accelerators;
    associating hardware accelerator addresses of a portion of the plurality of hardware accelerators to at least one processing unit (PU) or at least one logical partition (LPAR) of the computing system;
    receiving a work request for an associated hardware accelerator address; and
    queuing the work request for a hardware accelerator using the associated hardware accelerator address;
    wherein associating hardware accelerator addresses includes,
    identifying a shared pool of hardware accelerators of the plurality of hardware accelerators,
    providing a listing of the shared pool of hardware accelerators to a mapping server of the computing system, and
    associating addresses of the shared pool of hardware accelerators on the provided listing.

2. The method of claim 1, wherein associating hardware accelerator addresses includes:
    mapping a fixed set of accelerator address to the at least one PU or the at least one LPAR.

3. The method of claim 2, wherein mapping includes:
    identifying the fixed set of hardware accelerator addresses from a plurality of hardware accelerators of the computing system; and
    mapping the fixed set of hardware accelerator addresses to the at least one PU or the at least one LPAR during activation of an application residing on the at least one PU.

4. The method of claim 1, wherein associating addresses of the shared pool includes:
    associating memory-mapped input/output (MMIO) addresses of each hardware accelerator of the shared pool with a PU or LPAR on the provided listing.

5. The method of claim 1, wherein receiving a work request includes:
    receiving a work request from an application residing on the at least one PU or the at least one LPAR.

6. The method of claim 5, wherein the application issues the work request for the associated accelerator address in a horizontal pipeline.

7. The method of claim 5, wherein the application issues the work request for the associated accelerator address in a vertical pipeline.

8. The method of claim 1, wherein queuing the work request includes:
    queuing the work request in a virtual input queue on one of the PU, a partition of a hardware accelerator, and a combination of the PU and accelerator partition.

9. The method of claim 8, wherein the hardware accelerator is issued the work request in the vertical pipeline.

10. The method of claim 8, wherein the hardware accelerator is issued the work request in the horizontal pipeline.

11. The method of claim 1, wherein:
a plurality of work requests are received; and
each work request of the plurality of work requests is queued in a different hardware accelerator.

12. The method of claim 1, wherein:
a plurality of work requests are received; and
each work request of the plurality of work requests is queued in a different partition of the same hardware accelerator.

13. The method of claim 1, wherein:
a plurality of work requests is received; and
each work request of the plurality of work requests is queued in partitions of the same hardware accelerator until all partitions of the hardware accelerator have queued work requests.

14. The method of claim 1, wherein:
a plurality of work requests are received; and
each work request of the plurality of work requests is queued in a different hardware accelerator until all hardware accelerators using the associated addresses have queued work requests.

15. A computing system, comprising:
an accelerator farm; and
a plurality of hardware accelerators disposed in the accelerator farm, wherein,
each hardware accelerator of the plurality of hardware accelerators includes a plurality of partitions configured in a vertical pipeline associated with each hardware accelerator of the plurality of hardware accelerators,
the plurality of hardware accelerators is configured in a horizontal pipeline associated with all hardware accelerators of the plurality of hardware accelerators; and
hardware accelerator addresses of a portion of the plurality of hardware accelerators is associated to at least one processing unit (PU) or at least one logical partition (LPAR) of the computing system,
wherein a work request for an associated hardware accelerator address is received and queued for a hardware accelerator using the associated hardware accelerator address,
wherein associating hardware accelerator addresses includes,
identifying a shared pool of hardware accelerators of the plurality of hardware accelerators,
providing a listing of the shared pool of hardware accelerators to a mapping server of the computing system, and
associating addresses of the shared pool of hardware accelerators on the provided listing.

16. The computing system of claim 15, wherein a fixed set of hardware accelerators of the plurality of hardware accelerators is mapped to a processing unit of the computing system or a logical partition of the computing system.

17. The computing system of claim 15, wherein a shared pool of hardware accelerators is mapped to each processing unit of the computing system of each logical partition of the computing system.

18. The computing system of claim 15, wherein a shared pool of hardware accelerators is mapped to a listing included within a mapping server of the computing system.

* * * * *